United States Patent
Nanba et al.

(10) Patent No.: US 6,766,580 B2
(45) Date of Patent: Jul. 27, 2004

(54) METHOD FOR ASSEMBLING A VALVE IN A PASSAGE IN A VALVE SYSTEM

(75) Inventors: Kunio Nanba, Anjo (JP); Tomokazu Kondo, Okazaki (JP); Takuya Fukitsuke, Tokai (JP); Kunio Tanaka, Nagoya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 10/359,265

(22) Filed: Feb. 6, 2003

(65) Prior Publication Data

US 2003/0111628 A1 Jun. 19, 2003

Related U.S. Application Data

(62) Division of application No. 09/699,493, filed on Oct. 31, 2000, now Pat. No. 6,565,067.

(30) Foreign Application Priority Data

Nov. 1, 1999 (JP) ............................ 11-311466
Nov. 1, 1999 (JP) ............................ 11-311467
Nov. 1, 1999 (JP) ............................ 11-311561

(51) Int. Cl.[7] ................................... B23P 15/00
(52) U.S. Cl. ........................ 29/890.124; 29/890.12; 29/407.09; 29/407.1
(58) Field of Search ................... 29/890.124, 890.12, 29/407.09, 407.1, 464, 466, 467, 468; 137/15.18, 15.25

(56) References Cited

U.S. PATENT DOCUMENTS

| | | | | |
|---|---|---|---|---|
| 3,627,261 A | * | 12/1971 | Ludeman | ............... 251/305 |
| 3,783,316 A | | 1/1974 | Madigan | |
| 3,961,405 A | * | 6/1976 | Robinson | ............... 29/890.125 |
| 4,038,734 A | * | 8/1977 | Goldman | ............... 29/890.128 |
| 4,047,696 A | * | 9/1977 | Ludwig | ............... 251/308 |
| 4,406,176 A | | 9/1983 | Numazawa et al. | |
| 4,420,140 A | * | 12/1983 | Gachot | ............... 251/152 |
| 4,621,790 A | * | 11/1986 | Balter | ............... 251/305 |
| 4,690,164 A | * | 9/1987 | Gardner et al. | ............ 137/15.18 |
| 4,711,427 A | * | 12/1987 | Holtgraver | ............... 251/308 |
| 4,740,347 A | * | 4/1988 | Sloan et al. | ............... 264/262 |
| 4,860,706 A | | 8/1989 | Suzuki et al. | |
| 4,981,284 A | | 1/1991 | Imamura et al. | |
| 4,996,769 A | * | 3/1991 | Bongart | ............... 29/888.46 |
| 5,146,887 A | | 9/1992 | Gluchowski et al. | |
| 5,277,216 A | * | 1/1994 | Horton | ............... 137/15.25 |
| 5,401,001 A | | 3/1995 | Cook et al. | |

(List continued on next page.)

FOREIGN PATENT DOCUMENTS

| | | |
|---|---|---|
| EP | 0 899 073 | 3/1999 |
| JP | 49-57600 | 6/1974 |
| JP | 62-129538 | 6/1987 |
| JP | 01-249931 | 10/1989 |
| JP | 07-243441 | 9/1995 |
| JP | 8-26789 | 3/1996 |
| JP | 11-193725 | 7/1999 |
| SU | 1 214 945 | 2/1986 |
| WO | WO 99/28609 | 6/1999 |

OTHER PUBLICATIONS

Patent Abstract of Japan; JP 11 210503; Aug. 3, 1999; vol. 1999, No. 13.

(List continued on next page.)

Primary Examiner—I Cuda Rosenbaum
(74) Attorney, Agent, or Firm—Nixon & Vanderhye PC (57) ABSTRACT

A method of assembling a butterfly valve that includes a shaft rotatably supported by first and second bearing portions. A first adjusting instrument is used to adjust thrust and radial clearances between the first end of the shaft and the first bearing portion. A second adjusting instrument is used for adjusting thrust and radial clearances between the second end of the shaft and the second bearing portion, and the shaft is arranged at a center of the fluid flow passage.

4 Claims, 4 Drawing Sheets

U.S. PATENT DOCUMENTS

| | | | |
|---|---|---|---|
| 5,471,742 A | 12/1995 | Darr | |
| 5,687,691 A | 11/1997 | Kaiser et al. | |
| 5,797,589 A | 8/1998 | Kalebijan et al. | |
| 6,065,483 A | 5/2000 | Tanaka et al. | |
| 6,067,961 A | 5/2000 | Kato | |
| 6,224,349 B1 | 5/2001 | Iwanami et al. | |
| 6,367,773 B1 * | 4/2002 | Ito | 251/305 |

OTHER PUBLICATIONS

Patent Abstract of Japan; JP 10 077910; Mar. 24, 1998; vol. 1998, No. 08.

Patent Abstract of Japan; JP 06 010716; Jan. 17,1994; vol. 018, No. 212 (M–1593).

Patent Abstract of Japan; JP 11 006528; Jan. 12, 1999; vol. 1999, No. 04.

Patent Abstract of Japan, vol. 013, No. 244, Jun. 7, 1989 & JP 01 053027 Mar. 1, 1989.

Patent Abstract of Japan, vol. 1998, No. 10; Aug. 31, 1998 & JP 10 131774 May 19, 1998.

Patent Abstract of Japan, vol. 1999, No. 09; Jul. 30, 1999 & JP 11 093707 Apr. 6, 1999.

"Radial and Axial Play"; www.dynaroll.com/bearing–radial–play, XP00260482; 1 page.

"Equivalent Precision Classes"; www.qbcbearings.com/B605/qbctechequiv.htm, XP002260482; 1 page.

* cited by examiner

METHOD FOR ASSEMBLING A VALVE IN A PASSAGE IN A VALVE SYSTEM

This application is a Divisional of application Ser. No. 09/699,493 now U.S. Pat. No. 6,565,067, filed Oct. 31, 2000, the entire contents of which is hereby incorporated by reference in this application.

CROSS REFERENCE TO RELATED APPLICATION

This application is based on and incorporates herein by reference Japanese Patent Application Nos. Hei. 11-311466 filed on Nov. 1, 1999, Hei. 11-311467 filed on Nov. 1, 1999, and Hei. 11-311561 filed on Nov. 1, 1999.

BACKGROUND OF THE INVENTION

1. Field of the Invention

The present invention relates to an intake air controller including throttle valve suitable for use in a vehicle.

2. Description of Related Art

JP-A-1-53027 discloses an intake air controller for a vehicle, which includes a throttle body containing a throttle valve and a throttle valve shaft. One end of the throttle valve shaft is supported through a ball bearing having inner and outer races. A ring-like bearing stop cover is inserted into a cylindrical bearing holder of the throttle body to prevent the ball bearing from sliding out.

However, in JP-A-1-53027, since the bearing stop cover is used to prevent the slide-out of the ball bearing, the numbers of parts and manufacturing steps are increased, thereby increasing the manufacturing cost. Further, since the bearing stop cover is installed, the axial length of the bearing holder is lengthened, thereby axially enlarging the throttle body. As a result, an installation performance of the throttle body into an engine compartment is worsened.

JP-B2-8-26789 discloses an intake air controller for a vehicle, which includes a throttle body containing a throttle valve and a throttle valve shaft, and throttle position sensor detecting a rotation angle of the throttle valve. One end of the throttle valve shaft is supported through a ball bearing having inner and outer races.

The outer race is press inserted into an inner surface of a bearing holder, and the throttle valve shaft is press inserted into the inner race to eliminate an internal thrust clearance of the ball bearing for improving the detecting accuracy of the throttle position sensor. The throttle valve and the throttle valve shaft are made of iron series metal, and the throttle body is made of aluminum die-cast.

When a vehicle is used under an extremely high temperature condition (for example, 120° C.) or an extremely cold temperature condition (for example, −40° C.), the throttle valve and the shaft expand more than the throttle body, i.e., the throttle body shrinks more than the throttle valve and the shaft due to a thermal expansion coefficient difference between the throttle valve including the shaft and the throttle body. Thus, when the throttle valve is firmly positioned in a bore forming an intake air passage for eliminating the internal thrust clearance, the outer periphery of the throttle valve contacts the bore at an idling position thereof where the throttle valve fully closes the intake air passage.

In a conventional intake air controller, a throttle valve is attached to a throttle valve shaft without adjusting a clearance between the shaft and a bearing portion, thereby increasing a shaft vibration. Thus, a clearance between the outer periphery of the throttle valve and the inner wall of the bore varies.

Further, in the conventional intake air controller, a throttle valve fully closes an intake air passage at a particular rotation angle with respect to a surface perpendicular to the axis of the intake air passage. The throttle valve is attached to the shaft by making the throttle valve directly contact the inner wall of the throttle body to position the center of the throttle valve at the center of the intake air passage.

This conventional attaching method cannot be applied to an intake air controller in which the throttle valve fully closes the intake air passage by zero degree rotation angle, i.e., the throttle valve fully closes the intake air passage perpendicularly to the intake air passage, for improving a fluid flow amount control at a low flow amount range.

SUMMARY OF THE INVENTION

A first object of the present invention is to reduce the numbers of parts and manufacturing steps for an intake air controller, thereby reducing the manufacturing cost thereof, and to compact a throttle body.

A second object of the present invention is to prevent a micro-contact between a throttle valve and a throttle body due to a thermal expansion coefficient difference therebetween.

A third object of the present invention is to suppress a clearance between the outer periphery of a butterfly valve used for a throttle valve and the inner wall of the fluid flow passage from changing, and further to make the clearance small.

According to a first aspect of the present invention, an axial end of a bearing holder is crimped to prevent a bearing from sliding out, so that a bearing stop cover in the prior art is not needed to stop the slide-out of the bearing.

Thus, the number of parts and manufacturing steps for the intake air controller are reduced, thereby reducing the manufacturing const thereof. Since the bearing stop cover is not needed, the axial length of a bearing holder of the throttle body is shortened, thereby axially compacting the throttle body. As a result, an installation performance of the throttle body into an engine compartment is improved.

According to a second aspect of the present invention, within a ball bearing, a total of an internal thrust clearance between an inner race and a ball and an internal thrust clearance between an outer race and the ball is set at a predetermined clearance amount.

Thus, a shaft can slide in the axial direction, so that the throttle valve escapes from contacting the inner wall of the throttle body. That is, the micro-contact between the throttle valve and the throttle body due to the thermal expansion coefficient difference therebetween is prevented.

According to a third aspect of the present invention, first and second adjusting instruments put and support a shaft therebetween to position the shaft at the center of the fluid flow passage.

Thus, the clearance between the outer periphery of the butterfly valve and the inner wall of the fluid flow passage is suppressed from changing, and is made small.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

First Embodiment

An intake air controller controls a flow amount of an intake air flowing into an internal combustion engine based on accelerate pedal stroke of a vehicle, thereby controlling a rotation speed of the engine.

Figure 1:
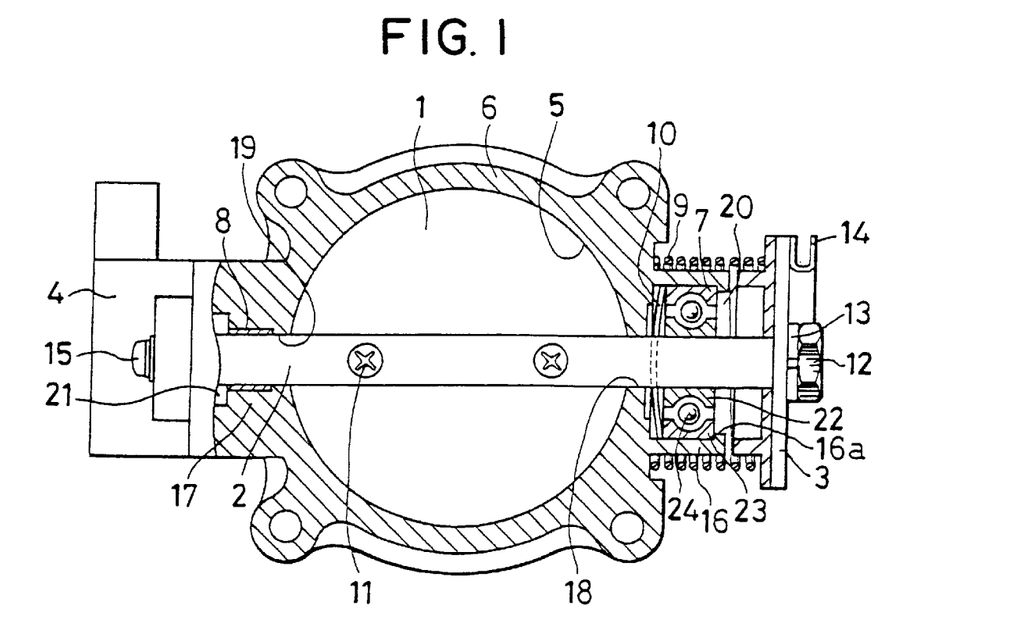
FIG. 1 is a cross-sectional view showing an intake air controller (first embodiment)

As shown in FIG. 1, the intake air controller includes a throttle valve 1, a throttle valve shaft 2, an accelerate lever 3, and a throttle position sensor 4. The throttle valve 1 is a butterfly type rotary valve, and adjusts the intake air flow amount. The throttle valve shaft 2 is integrated and rotates with the throttle valve 1. The accelerate lever 3 drives the throttle valve 1 and the shaft 2. The throttle position sensor 4 detects a rotation angle of the throttle valve 1.

The intake air controller further includes a throttle body 6 having a bore 5, a ball bearing 7, a thrust bearing 8, a spring washer 10. The bore 5 forms an intake air passage leading the intake air to the engine. The ball bearing 7 rotatably supports the rear end of the shaft 2. The thrust bearing 8 rotatably supports the front end of the shaft 2. The spring washer 10 is provided between the throttle body 6 and the ball bearing 7 to support the ball bearing 7.

The throttle valve 1 is made of iron series metal and fixed to the shaft 2 by screws 11. The throttle valve 1 is substantially formed in a disc. The shaft 2 is rotatably supported within the throttle body 6 through the ball bearing 7 and the thrust bearing 8. The shaft 2 is made of the same material as the throttle valve 1.

The accelerate lever 3 is fixed to the rear end of the shaft 2 by a bolt 12 and a washer 13. The accelerate lever 3 includes a connector 14 to which a wire cable (not illustrated) transmitting the accelerate pedal stroke is attached.

The throttle position sensor 4 is provided at the front end of the shaft 2. The throttle position sensor 4 includes a permanent magnet (not illustrated), a sensing element such as a Hall element, a Hall IC, and a magnetic resistance element. The permanent magnet rotates with the shaft 2 integrally and generates a magnetic field. The sensing element detects the rotation angle of the throttle valve 1 based on the magnetic force of the permanent magnet. The permanent magnet is fixed to the front end of the shaft 2 by a screw 15.

The throttle body 6 supports the throttle valve 1, and is fixed to an engine intake manifold by bolts. The throttle body 6 includes a rear bearing holder 16 and a front bearing holder 17. The rear bearing holder 16 rotatably supports the rear end of the shaft 2 through the ball bearing 7. The front bearing holder 17 rotatably supports the front end of the shaft 2 through the thrust bearing (plain metal bearing) 8.

The throttle body 6 is made of aluminum die-cast, and includes a rear circular hole 18 and a front circular hole 19 through which the shaft 2 is inserted. The rear bearing holder 16 includes a concave portion 20 opening at the rear end thereof. Similarly, the front bearing holder 17 includes a concave portion 21 opening at the front end thereof.

A coil return spring 9 is provided at the outer surface of the rear bearing holder 16. The return spring 9 resets the throttle valve 1 and the shaft 2 to the initial positions thereof when the engine idles. The rear end of the return spring 9 contacts the accelerate lever 3, and the front end thereof contacts the outer wall of the throttle body 6.

The ball bearing 7 includes an inner race 22, an outer race 23, and a plurality of balls 24. The inner race 22 is fit to the outer surface of the shaft 2, and the outer race 23 is fit to the inner surface of the rear bearing holder 16. The balls 24 are disposed between a raceway surface of the inner race 22 and a raceway surface of the outer race 23.

The rear end of the bearing holder 16 is crimped to prevent the outer race 23 from sliding rearwardly. The spring washer 10 is disposed between the bottom wall of the concave portion 20 and the ball bearing 7. The spring washer 10 axially urges the outer race 23 toward a crimp portion 16a. The spring washer 10 works as an elastic member of the present invention, and is made of a metal plate spring formed in a ring.

A manufacturing procedure of the intake air controller will be explained with reference to FIG. 1.

For installing the throttle valve 1 into the throttle body 6, the spring washer 10 is installed into the concave portion 20 at first. After that, the ball bearing 7 is installed into the concave portion 20, and the opening end of the concave portion 20 is crimped to prevent the outer race 23 from sliding rearwardly. Similarly, the ring-like thrust bearing 8 is press inserted into the concave portion 21 of the front bearing holder 17.

A shaft 2 is inserted, from the rear side to the front side of the throttle body 6, to penetrate through the circular holes 18, the ball bearing 7, the spring washer 10, the thrust bearing 8, and the circular hole 19. The screws 11 temporally fasten the throttle valve 1 to the shaft 2, and the throttle valve 1 is tested whether it can move from the idling initial position to the maximum load position thereof in the intake air passage.

After the throttle valve 1 is made sure that it can move from the idling initial position to the maximum load position thereof, the screws 11 firmly fasten the throttle valve 1 to the shaft 2. The return spring 9 is attached to the outer surface of the rear bearing holder 16, and accelerate lever 3 is fixed to the rear end of the shaft 2 by the bolt 12 and the washer 13.

The throttle position sensor 4 is installed into the throttle body 6. Finally, the wire cable is connected to the connector 14, so that the throttle valve 1 and the shaft 2 rotate in accordance with the accelerate pedal stroke.

The operation of the intake air controller of the present embodiment will be explained with reference to FIG. 1.

When a driver stamps on the accelerate pedal, the accelerate lever 3 rotates in accordance with the pedal stroke through the wire cable against the spring force of the return spring 9. The throttle valve 1 and the shaft 2 rotate by the same rotation angle as the accelerate lever 3, so that the intake air passage is opened by a predetermined degree. Thus, the rotation speed of the engine changes in accordance with the pedal stroke.

The throttle position sensor 4 detects the opening degree of the throttle valve 1, converts the opening degree into an electric signal (throttle opening degree signal), and sends the electric signal into an ECU. The ECU calculates the pedal stroke based on the throttle opening degree signal and determines a fuel injection amount for the engine.

When the driver stops stamping on the accelerate pedal, the return spring 9 resets the throttle valve 1, the shaft 2, the accelerate lever 3, the wire cable, and the accelerate pedal to the initial positions thereof. Thereby, the intake air passage is closed, so that the rotation speed of the engine returns an idling rotation speed.

As described above, according to the intake air controller of the present embodiment, the opening end of the concave portion 20 is crimped to prevent the outer race 23 of the ball bearing 7 from sliding rearwardly, so that a bearing stop cover in the prior art is not needed to stop the slide-out of the outer race 23.

Thus, the number of parts and assembling procedures for the intake air controller are reduced, thereby reducing the manufacturing cost thereof. Since the bearing stop cover is not needed, the axial length of the bearing holder 16 of the throttle body 6 is shortened, thereby axially compacting the throttle body 6. As a result, an installation performance of the throttle body 6 into an engine compartment is improved.

Further, since the spring washer 10 is provided between the bottom wall of the concave portion 20 and the outer race 23 of the ball bearing 7, the shaft 2 hardly slides in the axial direction. Thus, the outer periphery of the throttle valve 1 does not contact the inner wall of the bore 5.

Second Embodiment

In the first embodiment, since the shaft 2 hardly slides in the axial direction owing to the spring washer 10, a macro-contact between the throttle valve 1 and the bore 5 while a thermal expansion coefficient difference therebetween is not considered is prevented. However, a micro-contact between the throttle valve 1 and the bore 5 still exists while the thermal expansion coefficient difference therebetween is considered. An object of the second embodiment is to prevent such a micro-contact between the throttle valve 1 and the bore 5.

Figure 2:
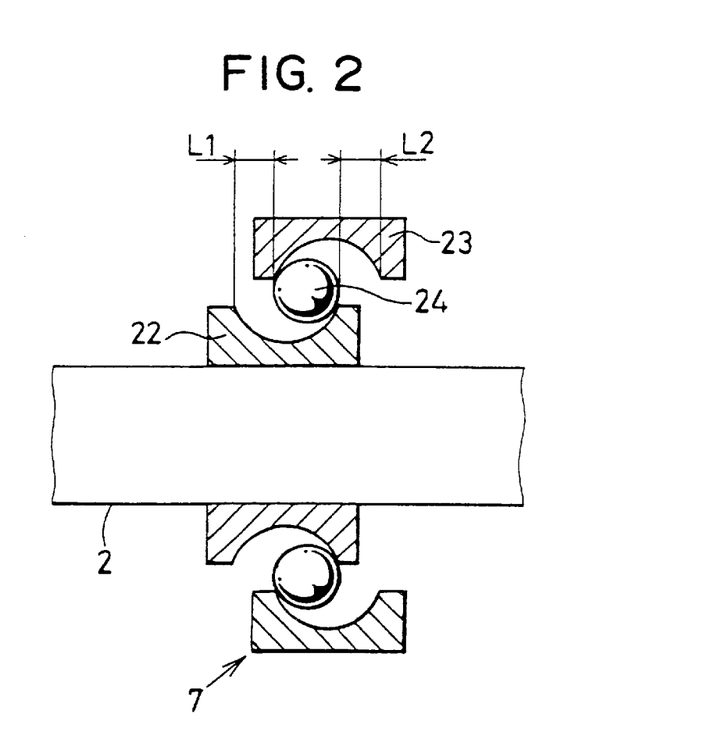
FIG. 2 is a cross-sectional view showing an internal thrust clearance of a ball bearing (second embodiment)

In the second embodiment, as shown in FIG. 2, an internal thrust clearance of the ball bearing 7 is a total of a first internal thrust clearance (L1) between the inner race 22 and the ball 24, and a second internal thrust clearance (L2) between the outer race 23 and the ball 24. The internal thrust clearance (L1+L2) of the ball bearing 7 is set 100 $\mu$m, for example. Here, the internal thrust clearance (L1+L2) should be more than 40 $\mu$m when the bore diameter of the throttle body 6 is $\phi$40, should be more than 60 $\mu$m when the bore diameter is $\phi$60, should be more than 80 $\mu$m when the bore diameter is $\phi$80, and should be more than 100 $\mu$m when the bore diameter is $\phi$100.

A manufacturing procedure of the intake air controller of the present embodiment will be explained with reference to FIGS. 1 and 2.

For installing the throttle valve 1 into the throttle body 6, the spring washer 10 is installed into the concave portion 20 at first. After that, the ball bearing 7 is installed into the concave portion 20, and the opening end of the concave portion 20 is crimped to fix the outer race 23 to the inner surface of the rear bearing holder 16. Alternatively, the ball bearing 7 may be press inserted into the concave portion 20, or a ring-like bearing stop cover may put the outer race 7 between the spring washer 10 and the bearing stop cover to fix the outer race 23 to the bearing holder 16. The ring-like thrust bearing 8 is press inserted into the concave portion 21 of the front bearing holder 17.

A shaft 2 is press inserted into the inner race 22, from the rear side to the front side thereof, to penetrate through the circular hole 18, the ball bearing 7, the spring washer 10, the thrust bearing 8, and the circular hole 19. The screws 11 temporally fasten the throttle valve 1 to the shaft 2, and the throttle valve 1 is tested whether it can move from the idling initial position to the maximum load position thereof in the intake air passage.

After the throttle valve 1 is made sure that it can move from the idling initial position to the maximum load position thereof, the screws 11 firmly fasten the throttle valve 1 to the shaft 2. Here, it is desirable that the first internal thrust clearance (L1) and the second internal thrust clearance (L2) are adjusted substantially equal (for example, 50 $\mu$m)

The return spring 9 is attached to the outer surface of the rear bearing holder 16, and accelerate lever 3 is fixed to the rear end of the shaft 2 by the bolt 12 and the washer 13.

The throttle position sensor 4 is installed into the throttle body 6. Finally, the wire cable is connected to the connector 14, so that the throttle valve 1 and the shaft 2 rotate in accordance with the accelerate pedal stroke.

As described above, according to the present second embodiment, even when the inner race 22 is press inserted into the outer surface of the shaft 2 and the outer race 23 is fixed to the inner surface of the bearing holder 16 by press insertion or crimping, the shaft 2 and the inner race 23 can slide in the axial direction by setting the internal thrust clearance (L1+L2) at the predetermined clearance (for example, 100 $\mu$m).

In this way, since the shaft 2 can slide in the axial direction, the throttle valve 1 escapes from contacting the inner wall of the bore 5 when there is a thermal expansion coefficient difference between the throttle valve 1 including the shaft 2 made of iron and the throttle body 6 made of aluminum die-cast. That is, the micro-contact between the throttle valve 1 and the bore 5 while considering the thermal expansion coefficient difference therebetween is prevented.

Third Embodiment

Figure 3:
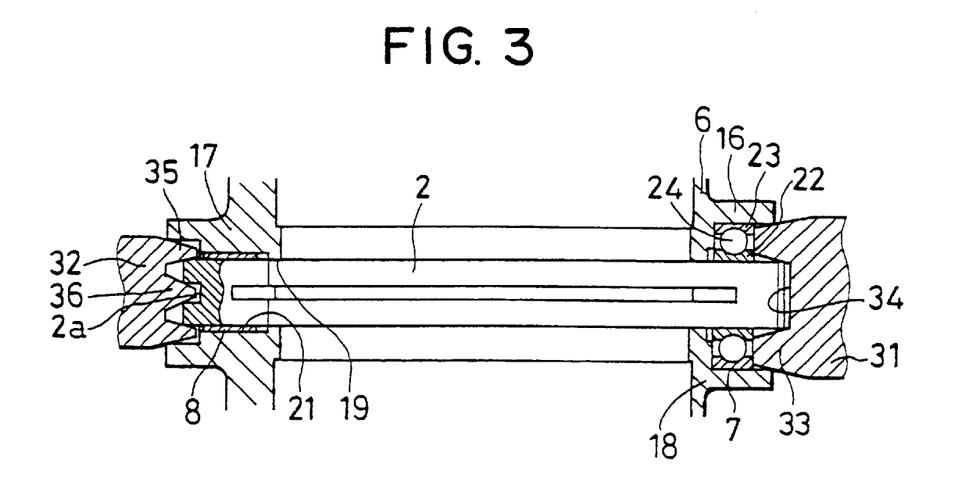
FIG. 3 is a cross-sectional view showing a centering procedure for a shaft (third embodiment)
Figure 4:
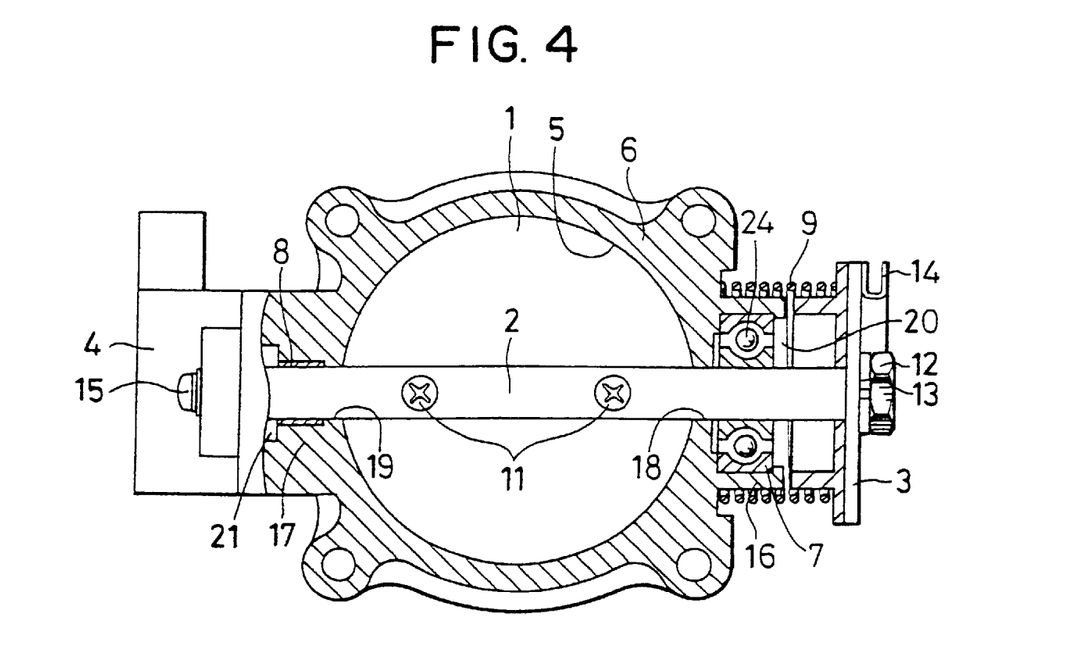
FIG. 4 is cross-sectional view showing an intake air controller (third embodiment)

In the third embodiment, as shown in FIG. 3, the rear end surface of the shaft 2 is formed in a flat, and the front end of the shaft 2 includes a groove 2a. Further, the rear end of the bearing holder 16 protrudes rearwardly more than the ball bearing 7. Similarly, the front end of the bearing holder 17 protrudes frontwardly more than the thrust bearing 8.

An assembling procedure of the throttle valve 1 of the present embodiment will be explained with reference to FIGS. 3–9.

First and second adjusting instruments 31, 32 are used for centering the shaft 2, and a clearance adjusting instrument 41 is used for centering the throttle valve 1.

A first bearing portion includes the shaft 2, the ball bearing 7, and the bearing holder 16. The first adjusting instrument 31 supports the rear end of the shaft 2 while adjusting the thrust and radial clearances of the first bearing portion so that the shaft 2 is assembled at the center of the bore 5.

Figure 5:
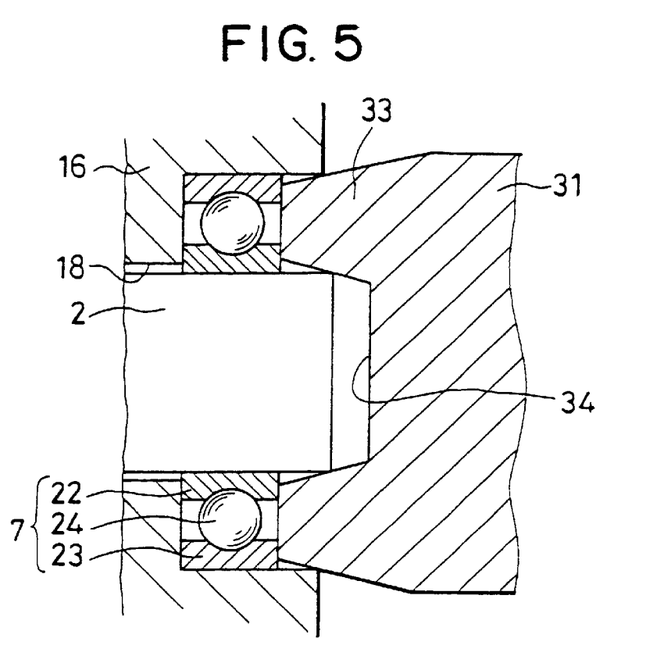
FIG. 5 is a cross-sectional view showing the centering procedure for the shaft (third embodiment)

As shown in FIG. 5, the front end of the first adjusting instrument 31 includes a ring-like projection 33. The projection 33 is fit to the end surface of the ball bearing 7, the bearing holder 16, and the outer periphery of the shaft 2. The projection 33 includes a concave portion 34 fit to the rear end of the shaft 2. The inner and outer walls of the projection 33 frontwardly taper such that the outer and inner diameters of the projection 33 gradually decrease toward the front end thereof.

A second bearing portion includes the shaft 2, the thrust bearing 8, and the bearing holder 17. The second adjusting instrument 32 supports the front end of the shaft 2 while adjusting the thrust and radial clearances of the second bearing portion so that the shaft 2 is assembled at the center of the bore 5.

Figure 6:
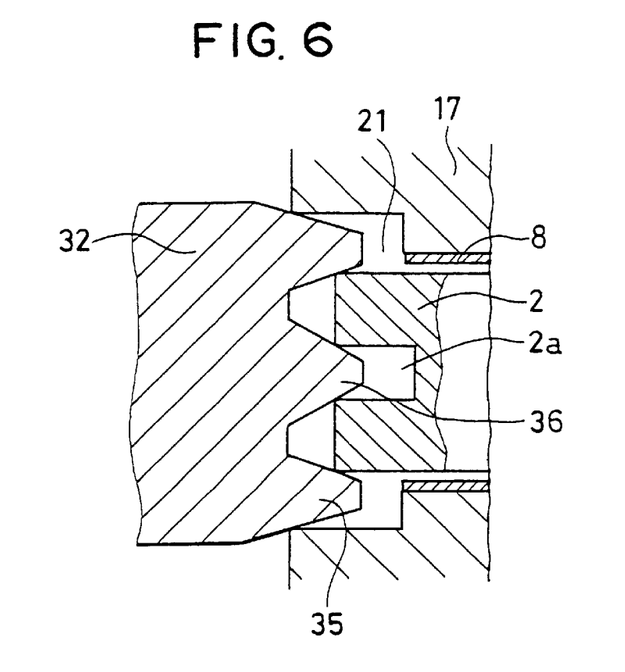
FIG. 6 is a cross-sectional view showing the centering procedure for the shaft (third embodiment)

As shown in FIG. 6, the rear end of the second adjusting instrument 32 includes a ring-like projection 35 and protrusion 36. The projection 35 is fit to the front surface of the bearing holder 17, and the outer periphery of the shaft 2. The protrusion 36 is fit to the groove 2a of the shaft 2. The inner and outer walls of the projection 35 rearwardly taper such that the outer and inner diameters of the projection 35 gradually decrease toward the rear end thereof.

Figure 7:
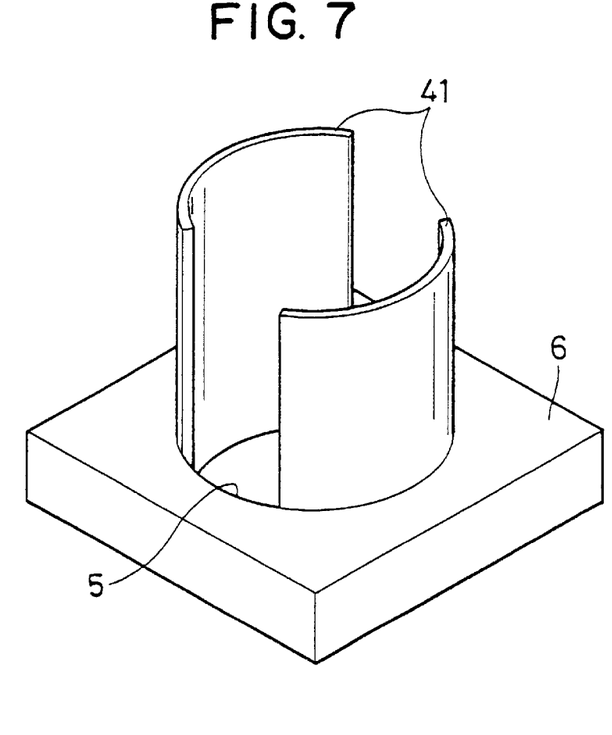
FIG. 7 is a perspective view showing a clearance adjusting instrument (third embodiment)
Figure 8:
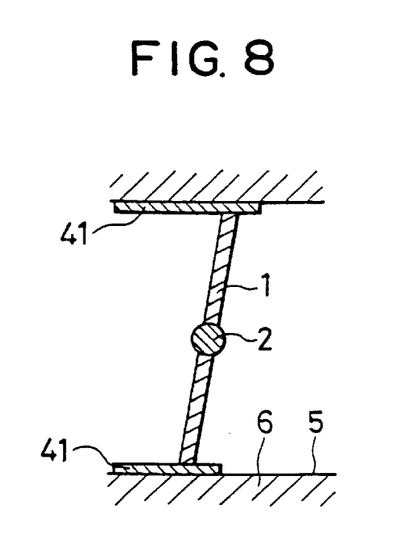
FIG. 8 is a cross-sectional view showing a centering procedure for a throttle valve (third embodiment)
Figure 9:
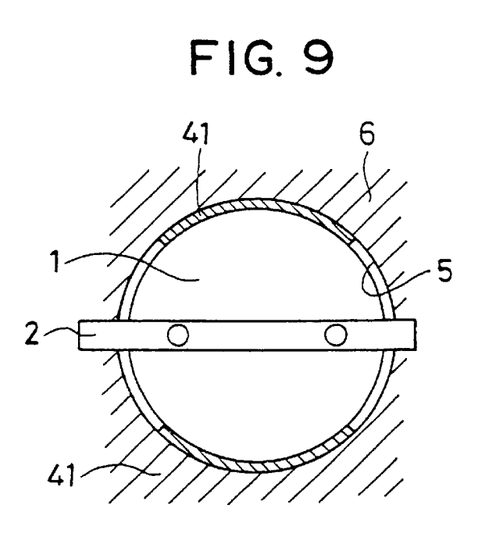
FIG. 9 is a cross-sectional view showing the centering procedure for the throttle valve (third embodiment).

The clearance adjusting instrument 41 assembles the throttle valve 1 into the throttle body 6 while adjusting a clearance between the outer periphery of the throttle valve 1 and the bore 5 to a constant clearance (for example, 50 $\mu$m). As shown in FIGS. 7–9, the clearance adjusting instrument 41 is formed in a couple of arc cylinders along the outer periphery of the throttle valve 1 and has a predetermined thickness (for example, 50 $\mu$m).

For installing the throttle valve 1 into the throttle body 6, the ball bearing 7 is installed into the concave portion 20 of the bearing holder 16 at first. That is, the outer race 23 of the ball bearing 7 is press inserted into and fixed to the inner surface of the bearing holder 16.

Alternatively, a ring-like bearing stop cover may put the outer race 23 between the throttle body 6 and the bearing stop cover to fix the outer race 23 to the bearing holder 16. The thrust bearing 8 is press inserted into the concave portion 21 of the bearing holder 17.

The shaft 2 is press inserted into the inner race 22, from the rear side to the front side of the throttle body 6, to penetrate through the circular hole 18, the ball bearing 7, the thrust bearing 8, and the circular hole 19. At this time, as shown in FIGS. 3, 5 and 6, the first and second adjusting instruments 31, 32 supports the shaft 2 while putting and centering the shaft 2 therebetween.

That is, as shown in FIGS. 3 and 5, the projection 33 of the first adjusting instrument 31 is fit to the ball bearing 7, the bearing holder 16, and the outer surface of the shaft 2 to press the shaft 2 frontwardly.

Similarly, as shown in FIGS. 3 and 6, the projection 35 of the second adjusting instrument 32 is fit to the bearing holder 17 and the outer surface of the shaft 2, and the protrusion 36 is fit to the groove 2a of the shaft 2. The second adjusting instrument 32 presses the shaft 2 rearwardly.

In this way, the first and second adjusting instruments 31, 32 put the shaft 2 therebetween.

The thrust and radial clearances in the shaft 2, the ball bearing 7 and the bearing holder 16 are adjusted, and the thrust and radial clearances in the shaft 2, the thrust bearing 8 and the bearing holder 17 are adjusted, so that the shaft 2 is arranged at the center of the intake air passage.

After that, the screws 11 temporarily fasten the throttle valve 1 to the shaft 2.

As shown in FIGS. 8 and 9, the clearance adjusting instrument 41 is fit to the inner wall of the throttle body 6 and the throttle valve 1 is rotated to contact the clearance adjusting instrument 41, so that the throttle valve 1 is centered to adjust the clearance between the outer periphery thereof and the inner periphery of the bore 5 to the constant 50 $\mu$m clearance.

The throttle valve 1 is tested whether it can move from the idling initial position to the maximum load position thereof in the intake air passage. After that, the screws 11 firmly fix the throttle valve 1 to the shaft 2.

The opening rear end of the concave portion 20 of the bearing holder 16 is crimped to firmly fix the outer race 23 to the inside surface of the bearing holder 16. The return spring 9 is attached to the outer surface of the rear bearing holder 16, and accelerate lever 3 is fixed to the rear end of the shaft 2 by the bolt 12 and the washer 13.

The throttle position sensor 4 is installed into the throttle body 6. Finally, the wire cable is connected to the connector 14 of the accelerate lever 3, so that the throttle valve 1 and the shaft 2 rotate in accordance with the accelerate pedal stroke.

As described above, the first and second adjusting instruments 31, 32 put and support the shaft 2 therebetween to position the shaft 2 at the center of the intake air passage.

That is, the throttle valve 1 is attached to the shaft 2 after the thrust and radial clearance of the shaft 2 is adjusted. Thus, a vibration of the shaft 2 is reduced, thereby suppressing the clearance between the outer periphery of the throttle valve 1 and the inner wall of the bore 5 from changing, and further making the clearance small.

Therefore, the flow amount of the intake air is highly accurately controlled, and the sealing performance while the throttle valve 1 fully closes the intake air passage at the idle position is improved without improving the manufacturing accuracy of the components such as throttle valve 1, shaft 2, and the throttle body 6, thereby suppressing the increase of the manufacturing cost.

Further, even in an intake air controller in which the throttle valve 1 fully closes the intake air passage by zero degree rotation angle thereof, i.e., the throttle valve 1 fully closes the intake air passage perpendicularly thereto, the throttle valve 1 can be positioned by providing the clearance adjusting instrument 41 between the outer periphery of the throttle valve 1 and the inner wall of the bore 5. Thus, the center of the throttle valve 1 can be positioned at the center of the intake air passage like a conventional intake air controller having an elliptical throttle valve.

Modifications

In the above-described embodiments, the throttle valve 1 and the shaft 2 are driven by mechanically transmitting the accelerate pedal stroke to the shaft 2 through the wire. Alternatively, the accelerate lever 3 may drive the throttle valve 1 and the shaft 2 to rotate.

In the above-described embodiments, the spring washer 10 is used as an elastic member urging the outer race 23 rearwardly. Alternatively, a spring, a plate spring, a cushion rubber or the like may be used as the elastic member.

In the above-described embodiments, the disc-like throttle valve 1 is used as the butterfly valve. Alternatively, an elliptic throttle valve may be used as the butterfly valve.

In the above-described embodiments, the present invention is used for an intake air controller for an internal combustion engine. Alternatively, the present invention may be used for a fluid flow amount control valve, or for a shut valve attaining a constant fluid flow amount.

In the above-described embodiments, the ball bearing 7 is used for the rear bearing, and the thrust bearing 8 is used for the front bearing. Alternatively, a thrust bearing may be used for a rear bearing, and a ball bearing may be used for a front bearing. Further, only ball bearings may be used for both bearings, or only thrust bearings may be used for both bearings.

In the third embodiment, the second adjusting instrument 32 includes the protrusion 36 fitting to the groove (concave portion) 2a at the front end of the shaft 2. Alternatively, the second adjusting instrument 32 may includes a concave portion fitting to a protrusion formed at the front end of the shaft 2. Further, a concave portion, a protrusion, or a flat surface may be formed at the rear end of the shaft 2. In this case, the front end of the first adjusting instrument 31 should be formed in an appropriate shape fitting to the rear end of the shaft 2.

In the third embodiment, the inner and outer surfaces of the projection 33 of the first adjusting instrument 31 taper frontwardly. However, the inner and outer surfaces of the projection 33 do not have to taper. Similarly, the inner and outer surfaces of the projection 35 of the second adjusting instrument 32 do not have to taper, and the outer surface of the protrusion 36 of the second adjusting instrument 32 do not have to taper either.

What is claimed is:

1. A method for assembling a butterfly valve in a fluid flow passage in a valve system, said valve system including:
    a shaft to which said butterfly valve is attached, said shaft being a rotation center of said butterfly valve;
    a first bearing portion rotatably supporting a first end of said shaft; and
    a second bearing portion rotatably supporting a second end of said shaft;
    the method for assembling said butterfly valve comprising steps of:
        using a first adjusting instrument for adjusting thrust and radial clearances between the first end of said shaft and said first bearing portion;
        using a second adjusting instrument for adjusting thrust and radial clearances between the second end of said shaft and said second bearing portion; and arranging said shaft at a center of said fluid flow passage.

2. A method for assembling a butterfly valve according to claim 1, wherein
    said first bearing portion includes a first bearing holder supporting a first bearing,
    said second bearing portion includes a second bearing holder supporting a second bearing,
    said method for assembling said butterfly valve further comprising steps of:
        fitting a ring-like projection of said first adjusting instrument to said first bearing, said first bearing holder, and the first end of said shaft, and fitting a ring-like projection of said second adjusting instrument to said second bearing holder and the second end of said shaft.

3. A method for assembling a butterfly valve according to further comprising steps of:
    temporarily fastening said butterfly valve to said shaft;
    putting a clearance adjusting instrument between said butterfly valve and an inner wall of said fluid flow passage for arranging said butterfly valve in such a manner that a clearance between said butterfly valve and the inner wall of said fluid flow passage is constant along an entire outer periphery of said butterfly valve; and
    firmly fixing said butterfly valve to said shaft.

4. A method for assembling a butterfly valve according to claim 2, wherein said second adjusting instrument includes a protrusion and the second end of said shaft has a groove,
    said method for assembling said butterfly valve further comprising:
        fitting said protrusion of said second adjusting instrument to said groove of the second end of said shaft.

* * * * *

UNITED STATES PATENT AND TRADEMARK OFFICE
CERTIFICATE OF CORRECTION

PATENT NO. : 6,766,580 B2
DATED : July 27, 2004
INVENTOR(S) : Nanba et al.

It is certified that error appears in the above-identified patent and that said Letters Patent is hereby corrected as shown below:

Title page,
Item [56], References Cited, OTHER PUBLICATIONS, the following document should be added:

-- Patent Abstract of Japan; JP 04 275842; Oct. 1, 1992; vol. 017, No. 074. --

Signed and Sealed this

Twenty-eighth Day of September, 2004

JON W. DUDAS
*Director of the United States Patent and Trademark Office*